(12) United States Patent
Detlef

(10) Patent No.: US 6,848,002 B1
(45) Date of Patent: Jan. 25, 2005

(54) SYSTEM AND METHOD FOR OPTIMAL SELECTION AND PRESENTATION OF STREAMING MEDIA TYPES

(75) Inventor: Michael J. Detlef, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/452,235

(22) Filed: Dec. 1, 1999

(51) Int. Cl.[7] ............................................... G06F 15/16
(52) U.S. Cl. .................................... 709/231; 709/219
(58) Field of Search ................................ 709/217, 219, 709/234, 235, 230, 231; 725/91, 93, 94, 96, 59; 707/500.1, 501.1

(56) References Cited

U.S. PATENT DOCUMENTS

| | | | |
|---|---|---|---|
| 5,550,576 A | * | 8/1996 | Klosterman .................... 348/6 |
| 5,835,698 A | * | 11/1998 | Harris et al. ............ 395/182.13 |
| 5,987,501 A | * | 11/1999 | Hamilton et al. ........... 709/203 |
| 6,018,710 A | * | 1/2000 | Wynblatt et al. ........... 704/260 |
| 6,151,634 A | * | 11/2000 | Glaser et al. ............... 709/236 |
| 6,166,778 A | * | 12/2000 | Yamamoto et al. ......... 348/569 |
| 6,173,328 B1 | * | 1/2001 | Sato ........................... 709/231 |
| 6,230,205 B1 | * | 5/2001 | Garrity et al. .............. 709/231 |
| 6,249,810 B1 | * | 6/2001 | Kiraly ........................ 709/217 |
| 6,314,466 B1 | * | 11/2001 | Agarwal et al. ............ 709/231 |
| 6,340,977 B1 | * | 1/2002 | Lui et al. .................... 345/709 |
| 6,377,991 B1 | * | 4/2002 | Smith et al. ................ 709/226 |
| 6,418,473 B1 | * | 7/2002 | St. Maurice et al. ....... 709/231 |

FOREIGN PATENT DOCUMENTS

WO     WO-00/36540 A1 *   6/2000           G06F/17/60

OTHER PUBLICATIONS

"MP3.com Launches Geographic Music Search System; 93 Countries and Every U.S. State Represented", Mar. 29, 1999, PR Newswire.*

* cited by examiner

Primary Examiner—Zarni Maung
(74) Attorney, Agent, or Firm—Marger Johnson & McCollom, P.C.

(57) ABSTRACT

A method and interface for providing media content to users across a network. The method includes the steps of presenting a media interface to the user that indicates the content provider for the media receiver and buffering adjacent content providers to allow the user to change providers without any delays. The selection of the content providers can be done in an initial set up step with user inputs, or automatically from the last settings on the interface of from defaults. The content provider information and locations are maintained in a registry with which the interface interacts if necessary. The interface includes a prompt for user inputs, the interface with the registry, a display for the user and a control that allows the user to select content providers.

11 Claims, 1 Drawing Sheet

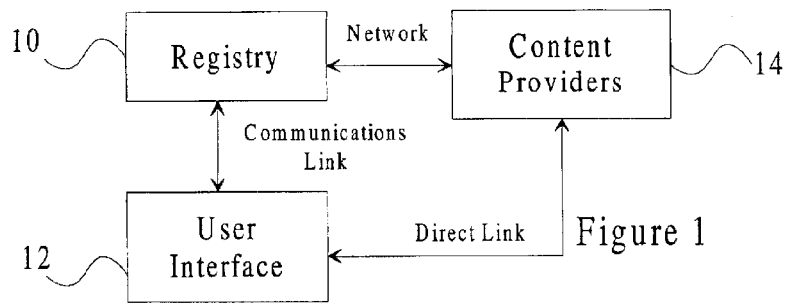
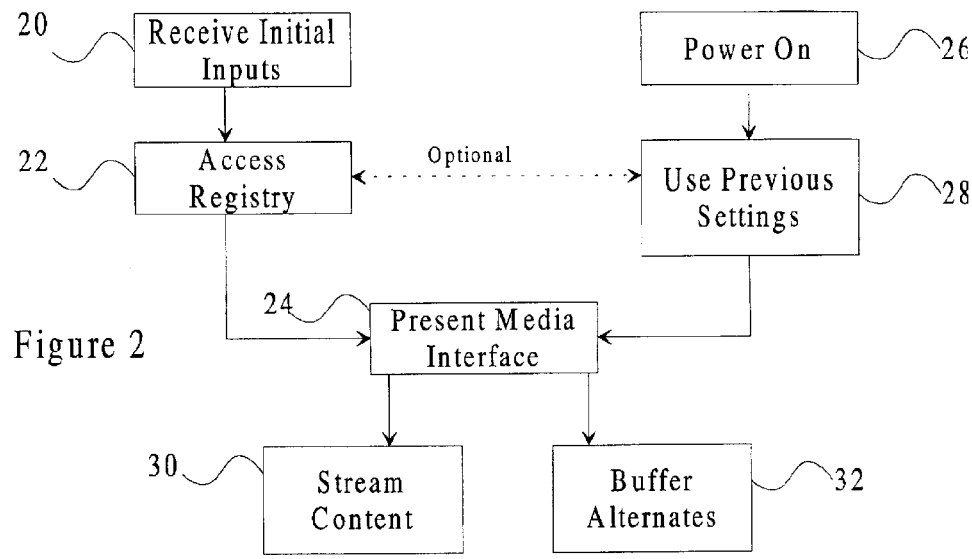
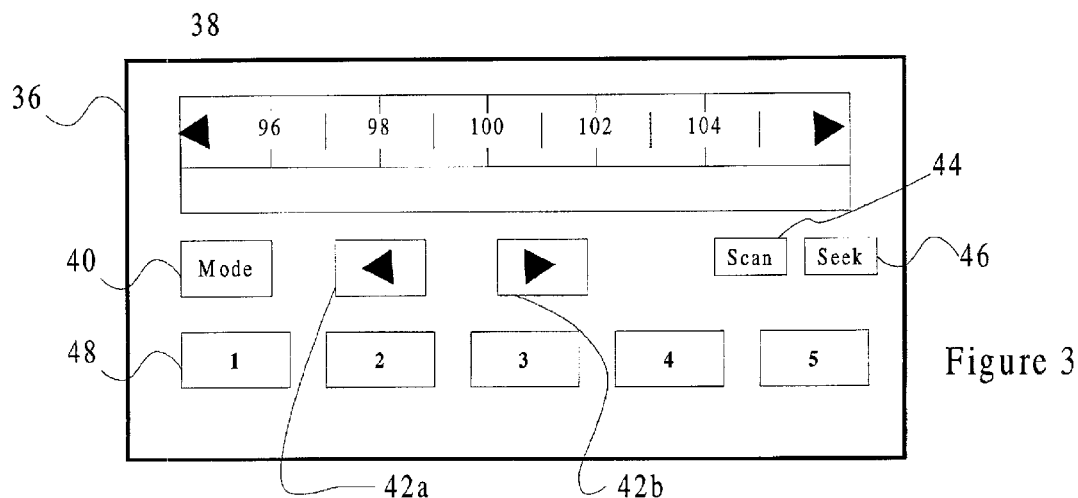

SYSTEM AND METHOD FOR OPTIMAL SELECTION AND PRESENTATION OF STREAMING MEDIA TYPES

BACKGROUND OF THE INVENTION

1. Field of the Invention

This invention relates to selection and presentation of streaming media, more particularly to a convenient and user-friendly system and method for providing users with streaming media across networks.

2. Background of the Invention

The Internet provides an example of a widely used network that allows users access to previously unobtainable information and content. One of its most powerful attributes lies in its ability to overcome geographically imposed barriers. Information can be transferred across the globe for the same cost and in nearly the same amount of time required to transfer that same information across a city. New applications are emerging that leverage this capability but the user interfaces fail to make it accessible to most users.

Streaming media players make a good example of this problem. Streamed media typically comprises content that is sent to the user in small pieces from a network, rather than requiring the entire content to be buffered at the user's site. Both audio and video data is being streamed across the Internet to users, allowing people with minimal memory for buffering to be able to hear and see content that they otherwise would be unable to access.

However, the user interfaces for these types of media present a significant barrier to most users. The interfaces require the user to enter a uniform resource locator (URL) for either the media site or a search engine. They also do not provide capabilities that the typical 'player' such as a radio or television have, such as the ability to scan the available stations, provide more than one channel without having to know the exact location of the other channels, and does not allow the user to select or restrict their preferences to certain stations, locations or types of content.

Some work has been done in this area, but it does not overcome these problems. For example, U.S. Pat. No. 5,895,471, issued Apr. 20, 1999, sets out a method for storing lists of frequently used links to URLs on a server, rather than on a user's computer. This is an advantage for limited-memory devices, such as mobile Internet devices. It allows users to store lists of frequently used links and design and configure their lists themselves. However, it does not overcome the difficulties in locating the links initially, nor does it solve the problems of having one interface that provides several options for streaming media.

Another example is U.S. Pat. No. 5,793,980, issued Aug. 11, 1998. This patent is owned by RealNetworks.com, which is probably best known for their media player, RealAudio™, which is available for free and is one of the dominant audio players on the Internet. The patent provides for a method for sending users on-demand audio content. However, in order to access the content, the user must go to RealNetworks web site, http://www.real.com. The user must then select the content they want and no provisions are made for allowing them to designate more than one audio provider, such as a radio station.

Another website that provides users with audio content can be found at http://www.broadcast.com, which provides a list of radio stations that offer content over the Internet. However, due to buffering delays, the user can only access one station at a time, and if that station drops of the air for some reason, the user must return to the site and select another one. Additionally, the providers use different players, such as RealAudio™ or Windows MediaPlayer™, and the user is required to download the necessary players Therefore, a system and method are needed to allow users to access streaming content over a network in a convenient and robust manner.

SUMMARY OF THE INVENTION

One aspect of the invention is a method of providing streaming media across a network to a user. The method includes the steps of presenting a media interface to a user, where the interface allows the user to see which content provider is providing the content to the user's player. The content provider can be selected upon initial set up of the interface on a stand-alone device or a personal computer. Alternatively, the interface can access the last settings used when the interface was previously powered off, or it can use default settings. The information on the content providers is maintained on a registry that is updated and managed by a server.

Another aspect of the invention is a media interface that includes a display, an interface to the registry and a control that allows the user to select content providers. The controls may include up and down arrows, scan and seek buttons and a mode button that allows the user to designate whether content providers should be organized by type of media, geographic location or format of the provider content.

A further aspect of the invention includes the option of having the server that maintains the registry also provide conversion services. This allows the user to receive content from providers that may use a different format from that used by a media player on the user device. In this manner, the availability of the content providers is increased for the user.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 shows a system diagram of a system for providing streaming media to users, in accordance with the invention.

FIG. 2 shows a method for providing a user interface for media receivers, in accordance with the invention.

FIG. 3 shows one embodiment of a user interface displayed upon a receiver, in accordance with the invention.

DETAILED DESCRIPTION OF THE PREFERRED EMBODIMENTS

A system for presentation of streaming media, which will also be referred to as streaming content, is shown in FIG. 1. The three components of the system shown in this example are a user interface 10, a registry 12 and at least one content provider 14. However, in order for this system to provide optimal performance to the user, there will preferably be several content providers.

The user interface 10 will be discussed in more detail with reference to FIG. 3 but could be a stand-alone device or a piece of software running on a personal computer, such as in a window. It will provide a means for the user to access the various content providers transparently, in a user-friendly and convenient way.

The registry 12 will typically comprise a network-based service that maintains the roster of available content providers. This registry could be in several forms, the most common of which would probably be a database of provider network addresses and information about that provider including physical location, type of content, airtimes or any other relevant information.

The content providers, or stations, 14 are those that provide streaming media over the network, whether that network be a public network such as the Internet, or a subscription or other proprietary network. It is assumed that the nature of the content providers is fairly fluid. Stations may go off the air, stop offering network-based broadcasts, start offering network-based broadcasts or change the content they provide. The registry 14 will have the task of updating the relevant information for existing content providers, as well as locating and setting up new content providers.

Various combinations of connections and interactions between these components with reference to FIG. 1. The user interface 10 could communicate only with the registry 12. The registry would then serve as a conduit for the content providers 14. This might be the case if the user is utilizing the interface on subscription basis, where the communications link is a proprietary network or connection.

Similarly, the connection between the content providers and the registry could be through a proprietary network. The registry would sign up content providers and would handle the user interactions for the content providers, which would probably include handling of any financial arrangements from user subscription fees. Alternatively, the connection between the registry and the content providers could be across a public domain network, such as the Internet and its successors. In addition, the connection between the registry and the user interface could be across a public domain network.

In the latter case, the user could be granted access to the registry for free, or could have an account set up with the registry provider. In any of these examples, the registry remains in the interaction between the user interface and the content providers.

In an alternative embodiment, the user interface could access the registry only to gather or update the necessary information about content providers. The user interface could then make direct connection to the content providers, removing the registry from the interaction. Again, the connection between the user interface and the content providers could be via some proprietary network, on an account basis, where the registry sends the user interface the necessary account codes, or for free with no constraints. Another alternative is that the user interface only accesses the registry at predefined intervals for updates only, otherwise making direct connection to the content providers in the majority of circumstances.

Having seen the interactions between the various components of the system, more detail on methods of providing the user interface will be discussed with reference to FIG. 2. Two possibilities for initializing the interface are discussed, however, it is not intended to limit the application of the invention. These possibilities are presented only as frameworks within which to discuss applicability of the invention.

Starting with step 20, the first situation addressed will be the initial starting of the user interface. This initial starting could be the first time the software is loaded and accessed on a PC or upon initial use of a stand-alone device. In step 20, the initial user inputs will be set. These inputs will typically include the user's preferences for various aspects of the interface including geographical preferences, type of content desired and format of the content providers.

The geographical preferences may indicate a city from which the user wishes to receive content. With the understanding that streaming media could be of several types, including audio, video, images and text, the discussion will focus on audio for ease of discussion. The geographical preference would then be an indication of what city, state or other geographical area from which the user wishes to select radio stations.

As mentioned previously, the type of content would be audio, video, images or other types of streaming media, possibly those that are not yet available. The format of the content providers would be the format of the programs available. For example, for radio stations format means the nature of the broadcasts, such as talk radio, classical music, eclectic, jazz, hip-hop, country, etc. In some embodiments of the invention, the user could specify both geography and format. For example, the user could select all classical radio stations in the Chicago metropolitan area.

Once the user has input the preferences, the registry maintained on the network is accessed and the stations fulfilling the user's requirements are selected. As mentioned previously, the registry has the task of updating itself and providing the correct information to the user interface for the selection of the content providers.

After all the necessary information is provided, the media interface is presented in step 24. Previous to this step, the user interface could have been presented in several ways. For example, in a stand-alone device, the display may have initialized upon first use with a user preference interface. Once the system is initialized, the interface that is presented is one that allows the user to access the various available content providers without the distraction of the user preference menus or other means for selecting the preferences. An alternate example would have the user preferences interfaces superimposed on the media interface until initial selections are made. At that point, the user preferences interfaces vanish, leaving the user with the media interface.

As can be seen in FIG. 2, step 24 is where the two examples of start up for the interface come together. The other example, besides initial use or access of the user interface, would be where the user had already used the device or the interface and powered it down or closed the window. In this case, the initial user preferences are not needed, having been previously set into the device or software. In this case, when the device powers on in step 26, it merely confirms that the user preferences are present and then moves to step 28 where it uses the previous settings.

Different possibilities exist for the previous settings. The previous settings could be the exact setting used prior to turning off the device or exiting the window. This is similar, using the audio example, of turning on a conventional radio that was at a given station when it was turned on. When the user turns on the radio, the same station is being received. Alternatively, the user could specify some default power on setting that the interface uses regardless of the station being accessed at power off. For example, the user may want to hear a broadcast from a local news-only station every time the interface is activated, and then go to a different content provider.

An option for this step is to confirm the information for the content providers, or to update the list of available content providers. This is shown in the connection between steps 28 and 22. The user interface may connect to the registry to access information about the current list of content providers or to check and see if there are any new or lost content providers. In the example where the registry acts as the conduit for content providers, this step would include the updating function that would not normally be performed as part of the connection.

Once the settings are determined, the device or window presents the user with the media interface. This process is probably very quick and is similar to the user turning on the radio. There is minimal delay as the content is buffered and then provided to the user in step 30.

Similar to a radio or television, the interface will strive to provide the user with alternate selections. There are several reasons why this is desirable. If the first station goes off the air, due to network congestion for example, a second station would have been buffered as an alternate channel in step 32. The selection of the second station could be designated by the user, or selected by the interface based upon the user's preferences.

With this alternate channel capability, several scenarios can be envisioned. For example, as mentioned above the alternate station may be accessed when the primary station is lost for whatever reason. The unit could then attempt to regain the primary station while playing content from the alternate station. In other scenarios, the first station may not actually be lost, but the interface may be programmed to treat it as lost if it falls outside a certain threshold metric such as latency, number of lost packets, etc. It is a significant advantage of the invention that the buffering of alternate channels or stations allows the user to receive the new content with no buffering delays.

Another capability provided by the buffering of additional stations is the ability for the user to 'scan the dial' or 'surf' the available stations. This capability becomes more clear with reference to an example of the user media interface in FIG. 3.

As can be seen by FIG. 3, the user media interface mimics the display of a radio, for the audio example used so far in this discussion. If the media interface is being utilized on the PC, several different media interfaces could be stored for each type of media. In a stand-alone device, it is probably preferable that the device have buttons that are either not labeled, but have adjacent tags on a display screen that can be changed with the type of media, or that have touch screen buttons on the display itself. This allows the display for a stand-alone device to be usable for different types of media in the most convenient fashion. Of course, other options for the stand-alone device are possible.

The media interface 36 has several components, some of which may be optional. The interface has a dial 38, that is a display of the range of numbers of radio stations, following the audio example. The display could have several extra features, such as markers on the dial at the various frequencies where stations are available, including the station's call sign, frequency or even the station logo.

The Mode button 40 allows the selection of the user preferences to be based upon geography, content, etc. For example, the interface could be put into the geography mode and available stations from the user's preferred city would then appear as options on the display. If the interface were put in the content mode, then all the stations of a particular content, such as classical music would appear. As mentioned previously, there could be a dual mode, where the user selects geography/content, for example. This would then display all the stations from a given geographic location of a certain content.

The buttons 42a and 42b allow the user to scan the dial, moving the selection from one station to another on the list of available providers. The Scan and Seek buttons, 44 and 46 respectively, perform the similar function to those on radios. The Scan button can move the selection from one provider to the next allowing the user to stop the scan at any given station. The Seek button allows the user to move to the next station on the dial. The Seek button could be separated from the Mode button to allow the user to move outside the given preferences and just locate the next station on the dial, regardless of geography or content.

In addition, the user can have preselected stations programmed into the buttons such as that shown at 48. These buttons could be physical buttons, such as on a conventional radio. However, with a touch-screen display or 'virtual' buttons, the buttons could even provide the call sign, frequency or content of a given station associated with that button. This display could change when the user changed modes. For example, the user may select 5 classical stations when in the content mode. The 5 classical stations could be from anywhere. In geographic mode, the 5 preset stations may be all different types such as classical, jazz, country, news, etc., but all from the same geographic location.

In this manner, an intuitive interface is presented to the user. The media interface makes the networking and buffering transparent to the user, as well as providing the user with uninterrupted content regardless of networking or buffering delays. In addition, several other features could be integrated into the network-based registry, making the interface even more user friendly.

For example, some radio stations that provide content on the Internet use RealAudio™ or Windows MediaPlayer™. However, the user needs to have one or the other, and sometimes both, on the PC to access content providers. With the user interface and the registry in place, either one could perform a conversion to allow the user to listen to the content independent of the format used to transmit it. This makes the technical aspects of the broadcast even more transparent to the user and makes the interface more robust.

The determination of the appropriate format could be done either by the server or by the user. For example, the server could scan the user's device and determine which players are present for a given type of media. It could then query the user as to which player the user wants to use, or it could make a selection on which was optimal for that particular content.

Alternatively, the user could designate which player is to be used in the user input steps of configuring the device. For example, many PCs come bundled with one or the other media players, but some users prefer to download and use a different player. In either case, the server determines the incoming format, selects the appropriate outgoing format, performs the conversion and then provides the user with content in the outgoing format.

Thus, although there has been described to this point a particular embodiment for a method and structure for presenting streaming media to users, it is not intended that such specific references be considered as limitations upon the scope of this invention except in-so-far as set forth in the following claims.

What is claimed is:

1. A method of providing media content to receivers, the method comprising:
    receiving initial user inputs from a user including a mode of organization of content providers;
    accessing a registry of content providers and associated content provider information based upon said initial user inputs;
    presenting a media interface to the user having markers to identify content providers, the user interface operable to allow the user to select one of several content providers identified in the registry;

providing content directly from a selected one of the several content providers;

identifying adjacent content providers having markers adjacent to a marker for the selected one, identification being based upon the mode of organization, wherein the mode of organization is one of geographical preference, type of desired content, and format of the content providers: and buffering the adjacent content providers.

2. The method as claimed in claim 1, wherein how the content providers are organized is by geographical preference.

3. The method as claimed in claim 1, wherein how the content providers are organized is by a type of desired content.

4. The method as claimed in claim 1, wherein how the content providers are organized is by a format of the content providers.

5. The method as claimed in claim 1, wherein the media interface is presented to the user on a stand-alone device.

6. The method as claimed in claim 1, wherein the media interface is presented to the user on a personal computer.

7. A method of providing media content to receivers, the method comprising:

determining content provider settings for a media receiver;

presenting a media interface to the user, wherein the user interface provides a marker indicating the content provider for the media receiver;

providing content to the user directly from the content provider;

identifying adjacent content providers having markers adjacent the marker for the content provider, identification being based upon how the content providers are organized, wherein how the content providers are organized is by one of geographical preference, type of content desired, and format of the content providers; and buffering adjacent content providers.

8. The method as claimed in claim 7, wherein the content provider settings are determined from final settings on the interface prior to power down.

9. The method as claimed in claim 7, wherein the content provider settings are determined from default settings designated by the user.

10. The method as claimed in claim-7, wherein determining content provider setting includes confirming information for the content provider.

11. The method as claimed in claim 7, wherein determining content provider setting includes updating information for the content provider, wherein updating information includes at least one of changing information for existing providers, removing off-air providers, and adding new providers.

* * * * *

UNITED STATES PATENT AND TRADEMARK OFFICE
CERTIFICATE OF CORRECTION

PATENT NO. : 6,848,002 B1  Page 1 of 1
DATED : January 25, 2005
INVENTOR(S) : Detlef It is certified that error appears in the above-identified patent and that said Letters Patent is hereby corrected as shown below:

<u>Title page,</u>
Item [56], References Cited, FOREIGN PATENT DOCUMENTS,
replace "6/2000" with -- 12/1998 --.

<u>Column 2,</u>
Line 5, replace "players" with -- players. --.

<u>Column 7,</u>
Line 10, replace "providers: and" with -- providers; --.

<u>Column 8,</u>
Lines 11 and 12, replace "providers; and" with -- providers. --.
Line 20, replace "claim-7" with -- claim 7 --.

Signed and Sealed this

Twenty-first Day of March, 2006

JON W. DUDAS
*Director of the United States Patent and Trademark Office*